United States Patent Office 2,891,058
Patented June 16, 1959

2,891,058
PROCESS FOR THE PREPARATION OF N-VINYL CYCLIC AMIDES, CARBAMATES, AND LACTAMS

Wilhelm E. Walles, William F. Tousignant, and Thomas Houtman, Jr., Midland, Mich., assignors to The Dow Chemical Company, Midland, Mich., a corporation of Delaware No Drawing. Application June 2, 1958
Serial No. 738,937

20 Claims. (Cl. 260—239.3)

The present invention contributes to the organic chemical arts. It has particular reference to an improved method for the manufacture of certain monoethylenically unsaturated N-heterocyclic monomeric compounds. The invention is specifically concerned with the preparation, by a new and useful procedure, of certain N-vinyl cyclic amides and N-vinyl cyclic carbamates of the respective formulae:

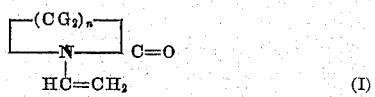
(N-vinyl lactams) (I)

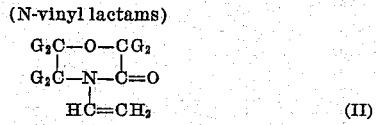
(N-vinyl-3-morpholinones) (II)

and

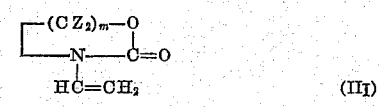
(N-vinyl-2-oxazolidinones and N-vinyl-2-oxazinidinones) (III)

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms and aryl radicals containing from 6 to about 10 carbon atoms; $n$ is an integer from 3 to 5; and $m$ is an integer from 2 to 3.

The N-vinyl lactams and many of their derivative products, as have been disclosed in United States Letters Patents Nos. 2,265,450, 2,335,454, and in many other places, are very useful and widely employed materials. Likewise, many of the N-vinyl-2-oxazolidinones and related N-vinyl cyclic carbamates have great utility and provide for many benefits and advantages in numerous applications, particularly as regards their polymeric and resinous derivatives. Monomeric and polymeric N-vinyl-2-oxazolidinones devoid of ring substitution other than hydrogen (but including, of course, the characteristic carbonyl unit) have been disclosed in United States Letters Patents Nos. 2,786,043, 2,818,362, and 2,818,399. In the first of these, the homopolymer is suggested as a plasticizer for acrylonitrile polymer compositions.

The basic object of the present invention is to provide a new and useful method for the manufacture of any and all of the N-heterocyclic monomeric compounds of the Formulae I, II, and III.

An associated object is to facilitate, on a more economical basis, the greater availability of certain of the contemplated monomers, particularly those of the Formula III and specifically the monomeric N-vinyl-2-oxazolidinones which contain the characterizing group:

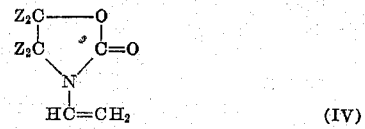
(IV)

wherein each Z is as above defined.

A specific object of the present invention is to provide an advantageous and more attractive method for the manufacture of non-ring-substituted N-vinyl-2-oxazolidinone which is of the structure according to Formula IV wherein each Z is hydrogen.

In accordance with the practice of the present invention, monomeric N-heterocyclic compounds of the Formulae I, II, and III may be prepared by a method which involves the transvinylation of a corresponding, unvinylated N-heterocyclic starting material with an alkyl vinyl ether under the influence of certain catalysts, such as mercuric acetate (HgAc₂). The alkyl (including cycloalkyl) vinyl ether that is employed may contain from 1 to about 10 carbon atoms or so in the alkyl radical. Ethyl vinyl ether, n-butyl vinyl ether, ethyl cyclohexyl vinyl ether and the like are typical of the alkyl vinyl ethers that may be suitably employed. As is apparent, the starting cyclic lactams and cyclic carbamates that are employed are of the respective formulae:

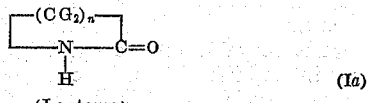
(Lactams) (Ia)

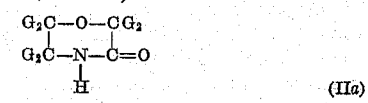
(3-morpholinones) (IIa)

and

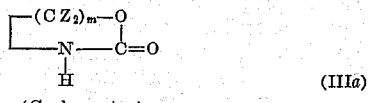
(Carbamates) (IIIa)

wherein G, Z, $n$ and $m$ have the above-described values.

A transvinylation according to the present invention (using, for purposes of illustration, 2-oxazolidinone and n-butyl vinyl ether as reactant materials to prepare N-vinyl-2-oxazolidinone) is represented by the following typifying equation:

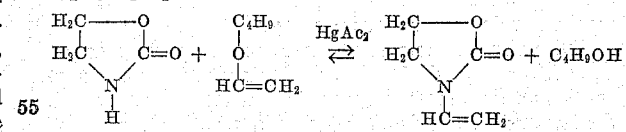

Some acetal by-products are also ordinarily obtained in the course of the reaction.

Other catalysts, including mercuric benzoate, zinc acetate and phenyl mercuric acetate may be employed in place of or in combination with the mercuric acetate. Still other catalysts which may be utilized for accomplishment of the transvinylation reaction of the present invention are other mercury salts of weak, preferably carboxylic, acids additional to those mentioned, which salts are soluble in the reaction mixture and are formed with acids having a pKa value in water in the range from about 4 to about 7. These include mercuric citrate, mercuric succinate, mercuric oxalate, mercurate linoleate and the like. Besides these, certain other organo mercury compounds (such as chloro mercuric acetate) which are soluble in the reaction mixture and which have ionization characteristics in water about commensurate with those of the indicated mercury salts of weak acids may also be used as catalysts, independently or in mixtures with other suitable materials, in the practice of the invention.

Salts which do not provide satisfactory results as regards efficacious prepartion of the desired monomeric products when attempted to be employed as catalysts in the practice of the present invention include mercuric chromate, mercuric fluoride, mercuric iodide, mercuric sulfate, mercuric nitrate, mercuric cyanide, mercuric chloride, mercuric thiocyanate, mercuric oxide, mercuric sulfide, mercurous sulfate, mercurous chloride, cuprous chloride, nickel bromide, nickel iodide, cobalt chloride, antimony trichloride, ferric chloride, bismuth nitrate, arsenic trichloride, sodium bisulfate, cobalt acetate, cobalt carbonate, cadmium acetate, cadmium carbonate, cadmium oxide, cuprous thiocyanate, cuprous cyanide, cuprous carbonate, ferrous sulfate, lead acetate, nickel acetate, nickel cyanide, nickel carbonate, nickel formate, and nickel sulfate.

Advantageously the catalyst employed is selected from the group consisting of mercuric acetate, mercuric benzoate, phenyl mercuric acetate and their mixtures.

Generally, an amount of the catalyst up to about 5 or 10 percent by weight, based on the weight of the reactant, may be required for the accomplishment of the transvinylation. Frequently, only 1 percent or less of the catalyst may be found necessary to employ. Usually, relatively greater quantities of the catalyst are required when the reaction is performed by batch-wise techniques instead of according to continuous processing arrangements.

It is desirable for the reaction to be conducted in a solvent vehicle that is free from substituent hydroxy groups (such as dioxane, dimethyl formamide and the dimethyl ethers of di-, tri-, or tetra-ethylene glycol and the like). The transvinylation will proceed in the absence of a solvent, however, particularly when liquid starting materials are employed (as may be obtained normally or by fusion). Despite this fact, the use of a solvent generally engenders better results. It is also desirable for the reaction mass to be maintained under an atmosphere of an inert gas, such as nitrogen, throughout the reaction, although the latter technique is likewise not an absolute requirement. The reaction may be performed and satisfactorily accomplished at temperatures in the range from about 110° C. to 170° C. or so. Better results may often be obtained when the temperature of reaction is maintained between about 140° C. and 160° C. The reaction will occur under any desired pressure although, when it is being conducted in autoclaves and the like apparatus, especially when solvent vehicles are employed, it is most convenient to accomplish the reaction under autogenous pressures.

Ordinarily, suitable (and quite frequently very good) conversions and yields of desired product from the converted starting materials can be realized according to the method of the invention within reaction periods of twenty-four hours or less. The precise yields to be obtained, of course, may oftentimes be found to vary with the particular starting material utilized, the catalyst or catalyst mixture employed, and the monomeric N-heterocyclic compound desired to be obtained. In many cases, especially with certain of the cyclic lactams and the cyclic carbamates, conversions in the neighborhood of 40-50 percent and greater and yields of from 80-90 percent and higher are not unusual.

The desired monomeric N-heterocyclic products can be recovered easily from the reaction mass using techniques best adapted to individual needs and calculated to suit the individual properties and characteristics of the material being isolated, as will be apparent to those having the skill of their calling. Ordinarily, fractional distillation procedures or solvent extraction, precipitation and stripping methods are adequate for satisfactory recovery of the monomeric products.

The invention is further illustrated in and by the following examples wherein, unless otherwise indicated, all parts and percentages are to be taken by weight.

*Example A*

About 174 grams (2.0 moles) of 2-oxazolidinone was dissolved in 500 grams of dioxane at a temperature of 40–50° C. To this solution there was added 1.0 gram of mercuric acetate as a catalyst. The mixture was then placed in an autoclave having a capacity of about 1.5 liters and blanketed therein with an atmosphere of nitrogen. About 200 grams (2.0 moles) of n-butyl-vinyl ether was then added to complete the charge in the autoclave. The charged ingredients were then heated at 140–150° C. for about 24 hours, after which period the reaction was terminated. The reaction mass was then removed from the autoclave and subjected to fractional distillation. Under mildly reduced pressure (200 mm. Hg) at temperatures up to about 130° C., substantially all of the lower boiling constituents (including dioxane, unreacted n-butyl vinyl ether and n-butanol) were stripped from the reaction mass. After initial fractionation, the residue was cooled to about 0° C., whereupon about 106 grams of unconverted 2-oxazolidinone crystallized therefrom and was recovered (in reusable condition) by filtration. The remaining residue, which was a liquid having a light brown color, was then subjected to further fractional distillation under an absolute pressure of about 1–2 mm. Hg. At 32° C., about a 25 gram cut of a dimeric product of n-butyl vinyl ether was obtained. At 90–96° C., about 80 grams of the desired monomeric N-vinyl-2-oxazolidinone was recovered. The yield of monomer, based on converted 2-oxazolidinone, was about 90 percent.

The monomer was a clear, colorless liquid which was soluble in water, alcohols and other organic solvents including dioxane, diethyl ether, dimethyl formamide, the dimethyl ethers of di-, tri-, and tetraethylene glycol. It was insoluble in cyclohexanone, octane and petroleum ether. It boiled at 88–96° C. under 1–2 mm. Hg and at about 90° C. under 1.4 mm. Hg. Its refractive index at 27° C. was 1.4925 and its specific gravity, taken at 25° C. and corrected to 4° C., was about 1.138 grams per cubic centimeter. Infrared analysis of the monomer produced spectra confirming the presence of the N-vinyl groups and

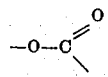

structural formations.

When the foregoing procedure was repeated excepting to conduct the reaction at a temperature of 160–165° C., a slightly lower yield of monomeric product was obtained. At reaction temperatures of 95–100° C., very little, if any, of the desired monomer could be prepared.

Similar results may be obtained when the foregoing transvinylation reaction is accomplished under the catalytic influence of mercuric benzoate, zinc acetate or other of the mentioned salts of mercury with weak carboxylic acids or with ethyl vinyl ether or ethylcyclohexyl vinyl ether.

*Example B*

About 101 grams (1 mole) of 5-methyl-2-oxazolidinone was dissolved in 200 grams of dry dioxane. To this solution there was added about 6 grams of mercuric acetate and 3 grams of benzoic acid. The mixture was then placed in an autoclave of the rocking variety having a capacity of about 1.5 liters and blanketed therein with an atmosphere of nitrogen. About 200 grams (2.0 moles) of n-butyl vinyl ether was then added to complete the charge in the autoclave. The charged ingredients were then heated to a temperature of about 165° C. and synthermally maintained thereat for a period of about 24 hours, after which period the reaction was terminated. The reaction mass was then removed from the autoclave and subjected to fractional distillation. Under mildly reduced pressure (200 mm. Hg) at temperatures up to about 130° C., substantially all of the low boiling constituents were stripped from the reaction mass. The remaining residue, which was a liquid having a black color, was then subjected to further fractional distillation under 1.3 mm. Hg at 86–92° C. About 50 grams of the desired monomeric N-vinyl-5-methyl-2-oxazolidinone was recovered. The yield of monomer, based on converted 5-methyl-2-oxazolidinone, was about 40 percent. The monomer product had the following properties and characteristics:

Soluble in water, dilute aqueous sodium chloride, methanol, ethanol, n-amyl alcohol, styrene, dioxane, diethyl ether, dimethyl formamide, the dimethyl ethers of di-, tri-, tetraethylene glycol, Skelly Solvent at 150–205° C., benzene, o-dichlorobenzene, chloroform, ethanol/-benzene 2B mixture, and 2-ethyl hexanol.
Insoluble in cyclohexane, octane, petroleum ether, Skelly Solvent at 60–70° C. and 100–140° C.
Boiling point under 1.4 mm. Hg _____ ° C__ 86–92
Refractive index at 25° C. _____ 1.4752
Specific gravity 20°/4° C. _____ 1.085

Similar results are obtained when the foregoing is repeated to prepare N-vinyl-4-methyl-2-oxazolidinone and N-vinyl-4,5-dimethyl-2-oxazolidinone, or when the reaction is accomplished using other of the indicated inert solvent vehicles. Analogous results are achieved when the reaction is repeated without using any solvent vehicle in the reaction mass.

Example C

A charge comprised of about 202 grams (2 moles) of 5-methyl-2-oxazolidinone; 288 grams (4 moles) of ethyl vinyl ether; 200 grams of dry dioxane and 12 grams (0.036 mole) of phenyl mercuric acetate was placed in a 1.5 liter rocking autoclave and heated to 155° C. at which temperature it was maintained for 24 hours. The autoclave was then permitted, over a 12 hour period, to cool to room temperature. The reaction product was then distilled under a vacuum following the general procedure of Example B. About 110 grams of monomeric N-vinyl-5-methyl-2-oxazolidinone and 110 grams of unreacted 5-methyl-2-oxazolidinone were recovered. This represented a 45 percent conversion of the 5-methyl-2-oxazolidinone and a 95 percent yield of the monomeric N-vinyl-5-methyl-2-oxazolidinone, based on converted 5-methyl-2-oxazolidinone.

When the foregoing procedure was repeated, excepting to conduct the reaction at higher temperatures of about 170° C., a somewhat lower yield of monomeric product was obtained. At reaction temperatures beneath the indicated range, very little, if any, of the desired monomer was prepared.

Example D

The general procedure of Example B was essentially repeated excepting to employ a reaction mixture of about 230 grams (2 moles) of 5-ethyl-2-oxazolidinone dissolved in about 300 grams of dioxane; and to use about 12 grams of mercuric acetate and 5 grams of benzoic acid as the catalyst; and to employ about 400 grams (4 moles) of n-butyl vinyl ether for the transvinylation. The transvinylation reaction was conducted at a temperature of about 155° C. About 130 grams (46 percent yield) of N-vinyl-5-ethyl-2-oxazolidinone product was recovered having physical properties and characteristics as described in the following:

Soluble in Skelly Solvent at 100–140° C. and 150–205° C., benzene, cyclohexane, o-dichlorobenzene, styrene, dimethyl formamide, chloroform, ethanol/benzene 2B mixture, n-amyl alcohol, 2-ethyl hexanol, dioxane, diethyl ether and tetraethylene glycol dimethyl ether.
Insoluble in water and Skelly Solvent at 60–70° C.
Boiling point under 0.7 mm. Hg _____ ° C__ 82–90
Refractive index at 25° C. _____ 1.4764
Specific gravity 20°/4° C. _____ 1.074

Example E

About 170 grams (2.0 moles) of 2-pyrrolidone (also known as 2-pyrrolidinone); 288 grams (4.0 moles) of ethyl vinyl ether; 200 grams of dry dioxane; 12 grams (0.036 mole) of phenyl mercuric acetate and 0.5 gram of cupferron were placed in a 1.5 liter rocking autoclave and heated at 155° C. for 12 hours. The autoclave was cooled to room temperature within 8 hours and the contents thereafter distilled in vacuum. About 14.8 grams of monomeric N-vinyl-2-pyrrolidone were obtained boiling at 68° C.–75° C./1.2 mm. Hg. Chemical and infrared analysis confirmed the product which evidenced its typical properties and characteristics upon evaluation therefor.

Example F

About 101 grams (1 mole) of 2-oxazinidinone (M.P. 78–80° C.); 216 grams (3.0 moles) of ethyl vinyl ether; 76 grams of dry dioxane; and 6.0 grams (0.018 mole) of phenyl mercuric acetate were placed in a 1.5 liter rocking autoclave and heated at 155° C. for 12 hours after which the reaction mass was permitted to cool over an 8-hour period. After cooling, about 59 grams of unreacted 2-oxazinidinone were filtered from the reaction mass. The filtrate was then distilled under vacuum and about 22 cubic centimeters of a light yellow colored liquid was collected at 98° C./1.0 mm. Hg. Analysis of this fraction indicated that it contained about 85.6 percent of monomeric N-vinyl-2-oxazinidinone, a compound having the structure of Formula III wherein each Z is hydrogen and $m$ has a numerical value of 3. A residue of about 23 grams remained after the distillation. The yield of the desired N-vinyl-2-oxazinidone was about 57 percent, as based on a 41 percent conversion of the starting 2-oxazinidinone material.

Example G

About 226 grams (2.0 moles) of 2-caprolactam (i.e., epsilon caprolactam); 432 grams (6 moles) of ethyl vinyl ether; and 12 grams (0.036 mole) of phenyl mercuric acetate were placed in a 1.5 liter rocking autoclave and heated to 155° C. for 12 hours. The vessel was then cooled to room temperature within 8 hours and the unreacted starting caprolactam filtered off from the reaction mass. The filtered reaction mass was then devolatilized by heating it to about 85° C. under 15 mm. absolute Hg pressure. The devolatilized product was a dark brown solid mass that weighed about 109 grams. Chemical analysis thereof indicated that it contained about 11.86 percent of monomeric N-vinyl-2-caprolactam. The N-vinyl heterocyclic lactam monomer was isolated by extraction with diethyl ether and subsequent distillation of the ether extract. A fraction collected at 81–91° C./2.0 mm. Hg was found to contain about 78 percent of the monomeric N-vinyl-2-caprolactam. This fraction was recrystallized three times from diethyl ether to yield a crystalline solid melting from about 35° C. to 38° C. which was found to be 95 percent pure N-vinyl-2-caprolactam. The monomer product exhibited its characteristic known properties upon investigation.

Example H

A mixture consisting of about 81.5 grams (0.5 mole) of 5-phenyl-2-oxazolidinone; 108 grams (1.5 moles) of ethyl vinyl ether; 100 grams of dry dioxane; and 3 grams (0.009 mole) of phenyl mercuric acetate was placed in a 1.5 liter rocking autoclave and heated to 154° C. for 24 hours. The reaction mixture was then allowed to cool to room temperature within an 8-hour period. The reaction product was thereafter heated at 145° C. under a vacuum of 1 mm. Hg absolute pressure to remove low boiling materials. The residue was placed in diethyl ether, whereupon a white solid precipitated. The precipitate was filtered and dried. Upon analysis, it was found to contain about 52 grams of monomeric N-vinyl-5-phenyl-2-oxazolidinone. The yield of monomer, based on converted 5-phenyl-2-oxazolidinone, was about 55 percent. The product was purified by recrystallization from an acetone-water mixture. The monomer was a white, crystalline solid which melted at 79.5–80.5° C. It was soluble in dioxane, acetone, chloroform, toluene, and the like. It was insoluble in water, lower alkyl alcohols (including methanol, ethanol and propanol) and in such solvents as Skelly Solvent at 77–115° C.

Similar excellent results may be obtained when the foregoing procedures are essentially duplicated to employ the transvinylation of the present invention for the preparation of such monomers as N-vinyl-5,5-dimethyl-2-oxazolidinone; N-vinyl-5-butyl-2-oxazolidinone; N-vinyl-5-propyl-2-oxazolidinone; N-vinyl-4-ethyl-2-oxazolidinone; N-vinyl-4,5-diethyl-2-oxazolidinone; N-vinyl-3-morpholinone and its various alkyl ring-substituted monomeric homologues; various alkyl and aryl ring-substituted N-vinyl-2-oxazinidinones; N-vinyl-2-piperidone; N-vinyl-5-methyl-pyrrolidone; N-vinyl-3,3-dimethyl-pyrrolidone; N-vinyl-3,3-piperidone; and the like and related monomeric N-vinyl heterocyclic amides and carbamates indicated to be within the scope and contemplation of the present invention.

What is claimed is:

1. Method for the preparation of monoethylenically unsaturated N-heterocyclic monomeric compounds selected from the group of N-vinyl cyclic amides and N-vinyl cyclic carbamates which consists of those having the structural formulae:

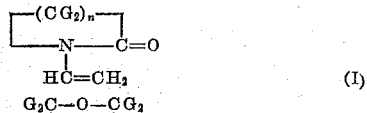

(I)

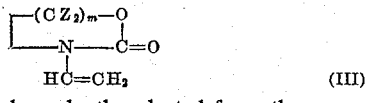

(II)

and $$\begin{matrix} \overline{\phantom{-}}(CZ_2)_m\overline{\phantom{-}}O \\ | \phantom{xxxxx} | \\ \underline{\phantom{-}}N\underline{\phantom{----}}C=O \\ | \\ H\overset{|}{C}=CH_2 \end{matrix}$$ (III)

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms, and aryl radicals containing from 6 to about 10 carbon atoms; $n$ is an integer from 3 to 5; and $m$ is an integer from 2 to 3; which method comprises mixing a starting material selected from the group of cyclic lactams, cyclic amides and cyclic carbamates consisting of those having the structural formulae:

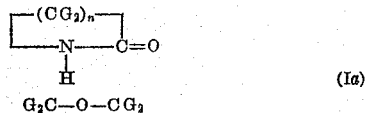

(Ia)

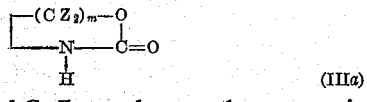

(IIa)

and $$\begin{matrix} \overline{\phantom{-}}(CZ_2)_m\overline{\phantom{-}}O \\ | \phantom{xxxxx} | \\ \underline{\phantom{-}}N\underline{\phantom{----}}C=O \\ | \\ H \end{matrix}$$ (IIIa)

wherein the values of G, Z, $n$ and $m$ are the same as in the Formulae I, II, and III with an alkyl vinyl ether that contains from 1 to about 10 carbon atoms in the alkyl group and a minor proportion of a catalyst that is soluble in the reaction mixture and is a mercury salt of a carboxylic acid which in water gives a pKa value of from about 4 to 7; then heating the mixture at an elevated temperature between about 110° C. and 170° C. until at least a portion of said starting material of the Formulae Ia, IIa, and IIIa has been transvinylated; and subsequently removing the thereby obtained N-heterocyclic monomer product of the Formulae I, II and III from the reacted mixture.

2. The method of claim 1, wherein said catalyst is selected from the group consisting of mercuric acetate, phenyl mercuric acetate, mercuric benzoate and their mixtures.

3. The method of claim 1, wherein mercuric acetate is employed as a catalyst in an amount between about 1 and 10 percent by weight, based on the weight of the reactant mixture.

4. The method of claim 1, wherein phenyl mercuric acetate is employed as a catalyst in an amount between about 1 and 5 percent by weight, based on the weight of the reactant mixture.

5. The method of claim 1, wherein said mixture is heated at a temperature between about 140° C. and 160° C. for a period of time that is not longer than about 24 hours.

6. The method of claim 1, and including in addition thereto and in combination therewith, the step of maintaining the mixture under an atmosphere of an inert gas during said transvinylation.

7. The method of claim 1, and including in addition thereto and in combination therewith, the step of mixing said reactant materials and said catalyst in a solvent vehicle therefor that is free from substituent hydroxy groups and performing said transvinylation in the resulting solution.

8. The method of claim 1, wherein said starting material is 2-oxazolidinone and said monomeric product is N-vinyl-2-oxazolidinone.

9. The method of claim 1, wherein said starting material is 5-methyl-2-oxazolidinone and said monomeric product is N-vinyl-5-methyl-2-oxazolidinone.

10. The method of claim 1, wherein said starting material is 5-ethyl-2-oxazolidinone and said monomeric product is N-vinyl-5-ethyl-2-oxazolidinone.

11. The method of claim 1, wherein said starting material is 5-phenyl-2-oxazolidinone and said monomeric product is N-vinyl-5-phenyl-2-oxazolidinone.

12. The method of claim 1, wherein said starting material is 2-oxazinidinone and said monomeric product is N-vinyl-2-oxazinidinone.

13. The method of claim 1, wherein said starting material is 3-morpholinone and said monomeric product is N-vinyl-3-morpholinone.

14. The method of claim 1, wherein said starting material is 2-pyrrolidone and said monomeric product is N-vinyl-2-pyrrolidone.

15. The method of claim 1, wherein said starting material is 2-piperidone and said monomeric product is N-vinyl-2-piperidone.

16. The method of claim 1, wherein said starting material is epsilon-caprolactam and said monomeric product is N-vinyl-2-caprolactam.

17. The method of claim 1, wherein said heating is continued until at least about 40 percent of said starting material has become transvinylated.

18. The method of claim 1, wherein said alkyl vinyl ether is ethyl vinyl ether.

19. The method of claim 1, wherein said alkyl vinyl ether is n-butyl vinyl ether.

20. The method of claim 1, wherein said alkyl vinyl ether is ethylcyclohexyl vinyl ether.

No references cited.